Aug. 7, 1934.  A. E. RICE ET AL  1,969,035
SPUR GEAR ROTARY MACHINE
Filed Sept. 3, 1929  3 Sheets-Sheet 2
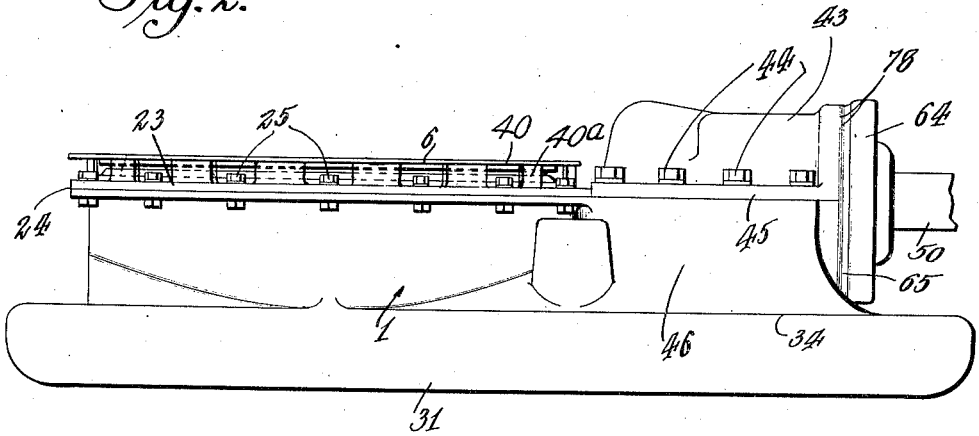
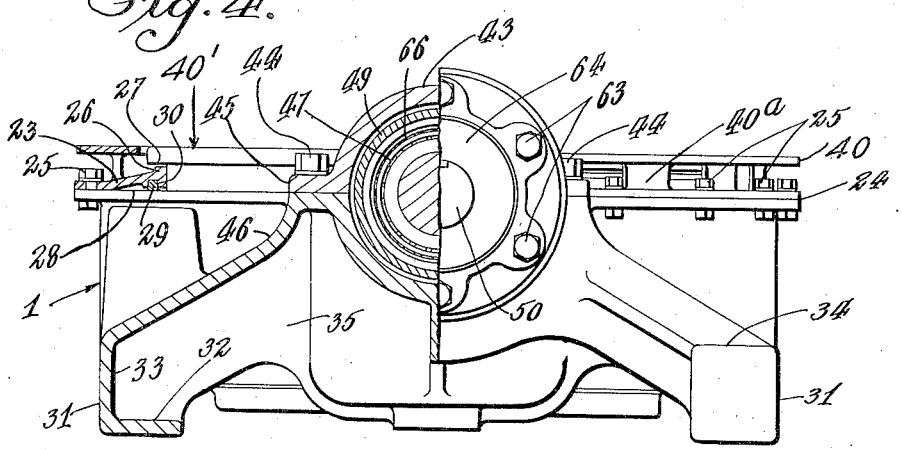

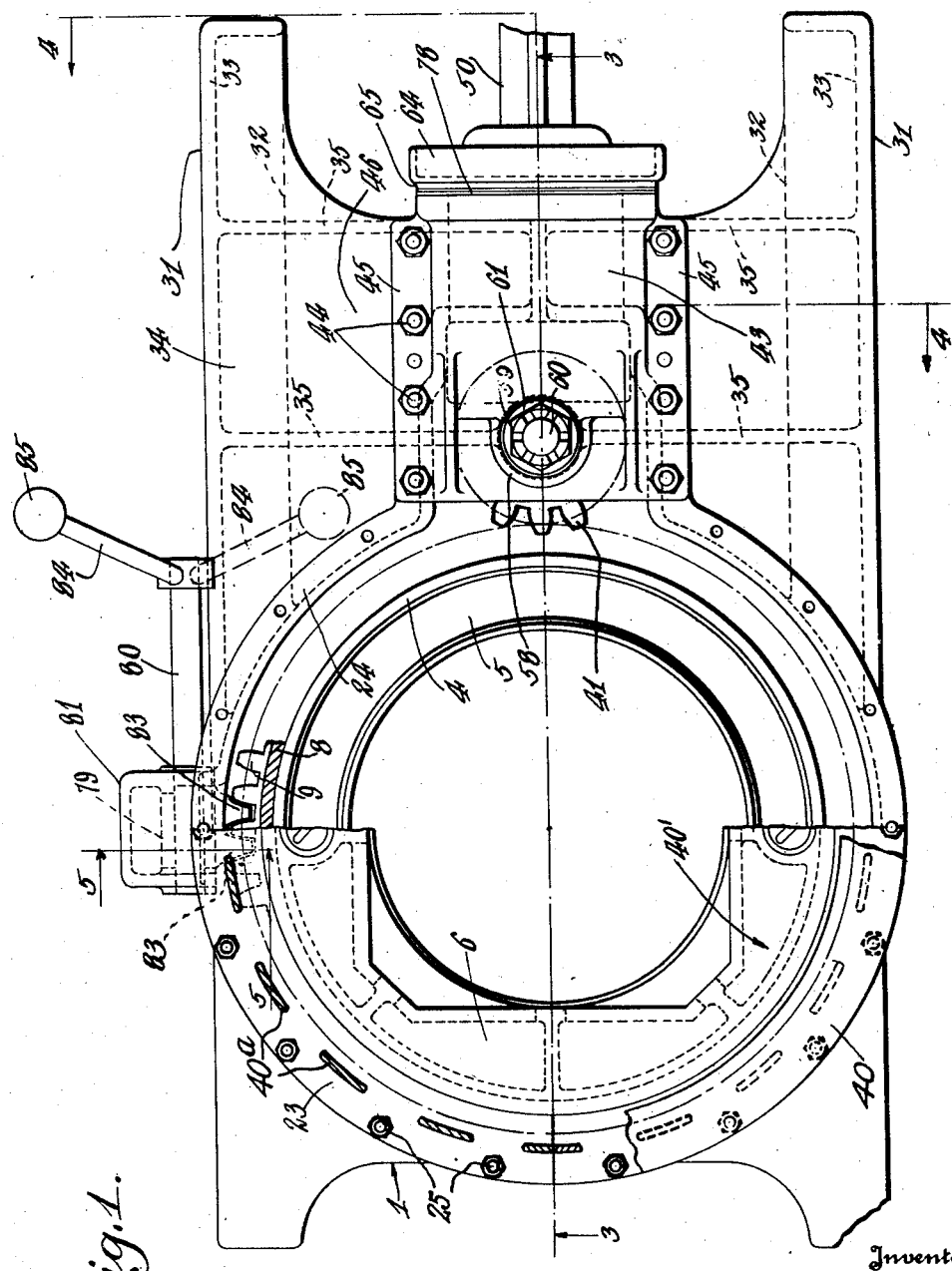

Aug. 7, 1934.　　A. E. RICE ET AL　　1,969,035
SPUR GEAR ROTARY MACHINE
Filed Sept. 3, 1929　　3 Sheets-Sheet 3
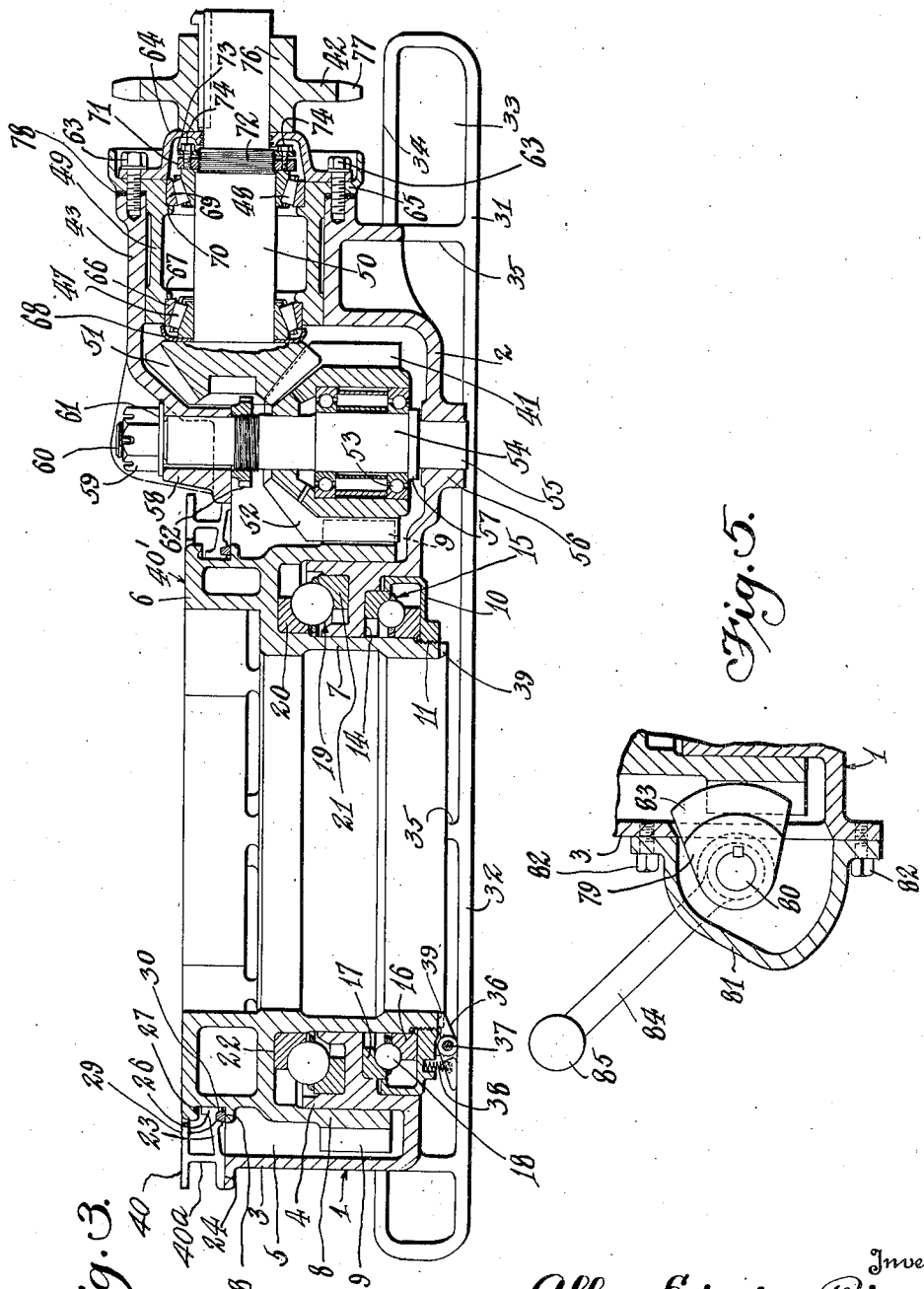
Inventors
Allen Erwin Rice
John Shelby Morgan Jr.
By Lyon & Lyon
Attorneys Patented Aug. 7, 1934

1,969,035

UNITED STATES PATENT OFFICE 1,969,035

SPUR GEAR ROTARY MACHINE

Allen Erwin Rice, Hermosa, and John Shelby Morgan, Jr., Inglewood, Calif., assignors, by mesne assignments, to The National Superior Company, Toledo, Ohio, a corporation of Delaware Application September 3, 1929, Serial No. 390,020

20 Claims. (Cl. 255—23)

This invention relates to rotary machines and more particularly to a rotary machine which is fully enclosed and is provided with a spur gear drive for driving the rotary machine from the pinion shaft.

An object of this invention is to provide a rotary machine, the rotary table of which may be lower in position in relation to the floor of the drilling derrick below the point usually occupied by the rotary machines of common construction and which is provided with a spur gear drive from the pinion drive shaft of such a rotary machine to the rotary table in a manner to permit the pinion shaft to be situated in the desired elevation from the floor of the rotary table in order to accommodate the sprocket drive customarily employed.

Another object of this invention is to provide a new and novel form of rotary table including a plain annular gear formed upon the vertically extending periphery of the rotary table sleeve in position to mesh with a spur idler pinion situated between the bevel pinion carried by the drive shaft and the plain annular gear carried by the rotary table.

Another object of this invention is to provide a rotary machine which is completely enclosed to avoid the introduction of mud, grit or other foreign matter into the bearings and driving gears of the rotary machine.

Other objects and advantages of this invention it is believed will be apparent from the following detailed description of a preferred embodiment thereof as illustrated in the accompanying drawings:

In the drawings:

Figure 1 is a top plan view of a rotary machine embodying our invention.

Figure 2 is a side elevation thereof on a reduced scale.

Figure 3 is a sectional elevation taken substantially on the line 3—3 of Figure 1.

Figure 4 is an end elevation partly in vertical mid-section.

Figure 5 is a fragmental sectional view taken substantially on the line 5—5 of Figure 1.

In the preferred embodiment of our invention illustrated in the accompanying drawings, 1 indicates a base which may be of any suitable or desirable construction and which we provide with an outwardly extending drive shaft supporting portion 2 and an annular flange 3 which extends vertically upward from the base 1. The base 1 is also provided with a bearing race annular flange 4 which is spaced from the flange 3 in order to provide an annular chamber 5. The rotary table 6 is provided with a central bore in which any suitable or desirable form of bushings may be mounted either to provide a straight rotary machine or a rotary machine of the make-and-break type as desired. The table 6 is formed with a downwardly extending flange 7 and a second downwardly extending flange 8 spaced from the flange 7. Formed integral with the flange 8 of the table 6, or formed as a ring and shrunk onto the flange 8 are gear teeth 9 through which the rotary table 6 is adapted to be driven. Secured to the lower end of the inner flange 7 is a ring 10 secured in position by screw-threading the same to the lower end of the ring 7 as indicated at 11.

Interposed between the ring 10 and the lower periphery 14 of the ring flange 4 of the base 1 is a bearing 15 which holds the rotary table 6 from vertical displacement from the base 1. The bearing 15 is herein illustrated as being formed of a pair of annular bearing races 16 and 17 between which balls 18 are positioned. Bearing means 19 are provided upon which the rotary table 6 is rotated during the supporting of a load by the rotary table 6. The bearing means 19 are herein illustrated as composed of balls interposed between annular rings 20 and 21. The annular ring 20 is mounted within the right-angle shoulder 22 formed by the downwardly extending annular flange 7 and the annular ring 21 is positioned within a recess formed in the cupped flange 4 of the base 1.

A split sealing ring 23 is provided that seals the space between the base and the table, and which fits the upper annular flange 24 of the flange 3 of the base 1 and is held in position by means of bolts 25. The ring 23 is provided on its inner end with an enlarged vertically extending ring 26 which fits within a recess formed between the shoulders 27 and 28 of the rotary table 6. Mounted on the shoulder 28 is a packing ring 29 which fits within a recess 30 formed in the under surface of the ring 23, sealing the ring 23 to the table 6 to prevent rotary mud, water, oil, or other foreign matter finding its way into the ring chamber 5 in which the gear teeth 9 revolve. The ring 23, as will be evident from Figure 2, completely seals the table 6 to the base 1, extending completely around the table 6. A guard 40 is cast integrally with the ring 23 and is spaced from the lower portion of the ring by a plurality of struts 40a. The guard 40 protects the bolts 25 and also provides a foot support for the operator working around the rotary table.

The base 1 is formed preferably as a one-piece integral casting and is cast not only to provide the base portion 1 of the rotary machine and the upstanding closure flange 3 together with the bearing flange 4 and the outwardly extending drive shaft supporting base 2, but is also cast to form integral skids 31 which are spaced apart on the rotary base and extend for the length of the entire rotary machine. The cast skids 31 are cast as channels with inwardly extending webs 32 at their bottom and a vertically extending web 33 which connects with the plain surface base casting 34 which provides a smooth top for the rotary machine externally of the rotary table 6. The base casting 1 is also provided with transversely extending webs 35 which connect the skids 31 together through the base structure.

Means are provided for latching the bearing ring 10 to the depending flange 7 of the rotary table 6, which means preferably includes a spring latch including a fulcrumed latch pawl 36 which is pivotally supported at 37 to the bearing ring 10 and yieldably urged to latching position by means of a spring 38. The latching pawl 36 engages in a detent 39 formed on the end of the flange 7 preventing the unthreading of the bearing ring 10 from the flange 7.

Means are provided for rotating the rotary table 6 in relation to the base 1, which means are so constructed as to enable the upper surface 40' of the rotary table 6 to be reduced in elevation from the floor of the drilling rig to a point where it is closer to the floor of the drilling rig and thus more convenient in operation and enabling the handling of the drill pipe, slips of the rotary machine, tongs and the like with greater ease by the operators of the rotary machine, and which means also includes a spur gear 41 adapted to mesh with the spur gear teeth 9 carried by the rotary table 6. The driving means for driving the rotary table also is of unitary construction, enabling the same to be easily attached to the outwardly extending portion 2 of the base 1 as a unit, and also provides an overhanging sprocket 42 which overhangs the end of the portion 2 of the base 1 and is elevated from the floor of the derrick a distance sufficient to provide the necessary clearance.

The driving means is preferably of the following construction and includes a housing 43 preferably of one-piece construction and adapted to be bolted by bolts 44 passing through the housing flange 45 and secured to the drive means housing wall 46 cast as an integral portion of the base 1.

Journaled in roller bearings 47 and 48, carried by a bearing ring 49 within the housing 43, is a pinion shaft 50. The pinion shaft 50 carries at its inner end a bevel pinion 51 which meshes with the bevel gear teeth 52 formed integral with the spur gear 41. The spur gear 41 is journaled on a bearing 53 on a shaft 54. The shaft 54 is secured in position within the housing 43, which extends in vertical position and at its lower end 55 is releasably mounted in a boss 56 formed through the outwardly extending portion 2 of the base casting 1. The shaft 54 is provided with a shoulder 57 which locates the bearing 53 and gear 41 axially on the shaft. The shaft 54 is at its opposite end secured to the housing 43 by passing through a boss 58 formed through the housing 43 and having a nut 59 screw-threaded on the end 60 thereof in position to engage a washer 61 interposed between the nut 59 and the upper surface of the housing 43. Screw-threaded on the shaft 54 within the housing 43 is a lock ring 62 which engages the under surface of the hollow boss 58 to lock the shaft 54 in position.

The bearing ring 49 which carries the roller or ball bearings 47 and 48 upon which the pinion shaft 50 is journaled is releasably secured within the housing 43 by means of bolts 63 which pass through a cap 64 and the flange 65 of the bearing ring 49 and are screw-threaded into the housing 43.

By this means of assembly the pinion shaft 50, supporting bearings 47 and 48 and bearing ring 49, together with the bevel pinion 51, may be removed as a unit from the housing 43 when desired or when it is required to repair or replace the bearings 47 and 48. The bevel roller bearing 47 is held in position by means of the bearing race member 66 engaging the shoulder 67 formed annularly within the bearing ring 49 and by means of a retaining ring 68 which engages the outer face of the bevel pinion 51. The roller bearing 48 is held in position by means of the bearing race 69 engaging an annular shoulder 70 formed within the bearing ring 49 and by engaging a ring 71 at its opposed end, the ring 71 being screw-threaded on the thread 72 formed on the pinion shaft 50. The ring 71 may be adjusted longitudinally of the shaft 50 to adjust the position of the bearing 48 and may be locked in position by means of a lock ring 73 and bolts 74 which are passed through the lock ring 73. The lock ring 73 is likewise screw-threaded to the thread 72 of the pinion shaft 50. The overhanging sprocket 42 is mounted on the outwardly extending end of the pinion shaft 50 in position to overhang the portion 2 of the base 1. The overhanging sprocket 42 is formed in position off-center in relation to its hub 76 so that by reversing the position of the sprocket 42 on the pinion shaft 50, the position of the teeth 77 of said sprocket may be adjusted in relation to the end of the housing 43 and also in relation to the drive chain or means provided for driving the sprocket 42.

In order to adjust the position of the bearing ring 49 within the housing 43, and hence the engagement of the bevel pinion 51 with the bevel teeth 52 of the spur gear 41, shims 78 are employed interposed between the end face of the housing 43 and the inner face of the flange 65 of the bearing ring 49.

Means are provided for locking the rotary table, which means may be of any suitable or desirable construction and are herein illustrated as including a locking pawl 79 which is secured to a lock shaft 80 journaled within a housing 81 secured to the closure flange 3 of the base 1 by means of bolts 82. The flange 3 is cut out to permit the locking pawl 79 to engage the spur teeth 9 formed on the depending gear of the flange 8 of the rotary table 6. The locking pawl 79 is formed with a pair of teeth 83 to fit between the teeth 9 of the rotary table 6. Secured to the shaft 80 is an operating handle 84 having a weight 85 at its end so that when the shaft 80 is rotated beyond center in either position as indicated in the full lines or in the dotted lines in Figure 1, the locking pawl 79 will be rotated to or from engaging position and held in such position by the force exerted by the weight 85.

Having fully described our invention, it is to be understood that we do not wish to be limited to the details herein set forth, but our invention is of the full scope of the appended claims.

We claim:

1. In a rotary machine, the combination of a base, a rotary table rotatably supported by the base, the rotary table having a vertically depending flange, spur gear teeth carried by said flange, the rotary table providing a second annular depending flange spaced from the first said depending flange, bearing means interposed in the annular recess formed between said flanges, and spur gear meshing with the spur gear teeth, and means for driving the spur gear.

2. In a rotary machine, the combination of a base, a rotary table rotatably supported by the base, the rotary table having a vertically depending flange, spur gear teeth carried by said flange, a second annular depending flange spaced from the first said depending flange to provide an annular chamber between said flanges, means secured to the base and extending upwardly between said flanges into said chamber, bearing means interposed between the first said means and the table in said annular chamber for rotatably supporting the table, and bearing means interposed between the inner of said depending flanges and said first means extending into the annular chamber for holding the table from upward vertical displacement relative to the base.

3. In a rotary machine, the combination of a base, a rotary table rotatably supported by the base, spur gear teeth carried by the table, a unitary pinion shaft assembly, means for removably securing the pinion shaft assembly to the base, the pinion shaft assembly including a pinion shaft, a beveled pinion mounted on the pinion shaft, a spur gear, means for driving the spur gear from the beveled pinion, the spur gear being held in position to mesh with the spur gear teeth carried by the table, a housing enclosing the unitary pinion shaft assembly, the unitary pinion shaft assembly being withdrawable as a unit from said housing, the pinion shaft extending from said housing, and drive means carried by the pinion shaft exteriorly of the housing.

4. In a rotary machine, the combination of a base, a rotary table rotatably supported by the base, spur gear teeth carried by the table, a spur gear mounted to mesh with the spur gear teeth, a vertically extending shaft for rotatably supporting the spur gear, the spur gear being provided with beveled teeth, and means adapted to mesh with the beveled teeth for driving the spur gear, and a housing removably secured to said base for enclosing the spur gear and the means for driving the spur gear.

5. In a rotary machine, the combination of a base, a rotary table rotatably supported by the base, the base being of one-piece construction and providing an outwardly extending portion, a unitary pinion shaft assembly removably secured to the base, spur gear teeth carried by the rotary table, and the unitary pinion shaft assembly including a spur gear adapted to mesh with the spur gear teeth carried by the table, the spur gear being adapted to rotate around a vertically extending axis, and means for driving the spur gear including a pinion shaft, and means interposed between the pinion shaft and the spur gear for driving the spur gear from the pinion shaft, a housing for enclosing the pinion shaft and spur gear, and an overhanging sprocket secured to the pinion shaft exteriorly of said housing and overhanging the outwardly extending portion of the base.

6. In a rotary machine, the combination of a base, a rotary table rotatably supported by the base, the table being provided with a downwardly depending annular flange, spur gear teeth carried by said annular flange, the rotary table providing a second annular depending flange, bearing means interposed in the annular recess formed between said flanges, said bearing means including a down thrust radial bearing located above the horizontal central plane of the annular spur gear, an up thrust radial bearing located below the horizontal central plane of the annular spur gear, a spur gear pinion meshing with the annular spur gear, and means for driving the spur gear pinion.

7. In a rotary machine, the combination of a base, a rotary table rotatably supported by the base, an annular spur gear carried by said table, a spur gear pinion meshing with said annular spur gear, a bevel gear above the spur gear pinion and formed integral therewith, internal bearing means within said bevel and spur gear pinion, including bearings extending to either side of the horizontal central plane of the spur gear portion of said pinion, a drive pinion shaft mounted above the plane of the annular spur gear, a bevel gear pinion mounted on said pinion shaft and meshing with the first mentioned bevel gear, bearings for said pinion shaft, a unitary mounting for said pinion shaft bearings, and a driving means attached to the outer end of said overhanging pinion shaft.

8. In a rotary machine, the combination of a base, a rotary table rotatably supported by the base, an annular spur gear carried by said table, a spur gear pinion meshing with said annular spur gear, a bevel gear above the spur gear pinion and non-rotatably secured thereto, bearing means supporting said spur gear and bevel gear located on either side of the horizontal central plane of the spur gear pinion, a pinion drive shaft mounted above the plane of the annular spur gear, a bevel gear pinion mounted on said pinion shaft and meshing with the first mentioned bevel gear, and a driving means attached to the outer end of the drive pinion shaft.

9. In a rotary machine, the combination of a base, a rotary table rotatably supported by the base, an annular spur gear carried by the table, bearing means between the table and the base for rotatably supporting the table on the base, bearing means between the table and the base below the central plane of the spur gear for holding the table down upon the base, and a spur gear pinion supported by the base to mesh with the annular spur gear.

10. In a rotary machine, the combination of a base, a rotary table rotatably supported by the base, the rotary table having a downwardly depending annular flange, an annular spur gear carried by said flange, the rotary table having a second downwardly depending annular flange positioned concentrically within the first said annular flange, up-and-down thrust bearing means interposed between the said annular flanges for rotatably supporting the table with relation to the base, a spur gear pinion meshing with the annular spur gear, and means for driving the spur gear pinion.

11. In a rotary machine, the combination of a base, a rotary table rotatably supported by the base, the rotary table having a downwardly depending annular flange, an annular spur gear carried by said flange, the rotary table having a second downwardly depending annular flange positioned concentrically within the first said annular flange, up-and-down thrust bearing means interposed between the said annular flanges for rotatably supporting the table with relation to the base, a spur gear pinion meshing with the annular spur gear, means for driving the spur gear pinion, and annular enclosing means formed integral with the base and extending upwardly therefrom to operatively engage the table for enclosing the annular spur gear.

12. In a rotary machine, the combination of a base, a rotary table rotatably supported by the base, an annular spur gear carried by said table, a spur gear pinion meshing with said annular spur gear, the said spur gear pinion being carried by a unitary drive assembly including a vertically extending shaft, a horizontally extending shaft, means for supporting said vertically and horizontally extending shafts, and bevel pinions operatively connected between the horizontal and vertically extending shafts, one of said bevel pinions being coaxially non-rotatably secured with relation to the spur gear pinion, and the said assembly being supported in position within a housing a portion of which is formed integral with the base, and a second portion which is removably secured to the first said portion so that upon removal of the latter said portion the said assembly may be removed as a unit.

13. In a rotary machine, the combination of a base, a rotary table rotatably supported by the base, an annular spur gear carried by said table, a spur gear pinion meshing with said annular spur gear, a bevel gear above the spur gear pinion, means connecting said bevel gear and spur gear pinion, means for rotatably supporting the spur gear pinion and the bevel gear, a horizontally extending pinion shaft above the annular spur gear, and a bevel pinion secured to the said shaft to mesh with the bevel gear, and means for driving the shaft.

14. In a rotary machine, the combination of a base, a rotary table rotatably supported by the base, an annular spur gear carried by said table, a spur gear pinion meshing with said annular spur gear, a bevel gear above the spur gear pinion and non-rotatably secured thereto, means for rotatably supporting the spur gear pinion and the bevel gear, a horizontally extending pinion shaft above the annular spur gear, and a bevel pinion secured to the said shaft to mesh with the bevel gear, means for driving the shaft, bearings for said shaft, a unitary mounting for said shaft bearings, and a driving means attached to the overhanging outer end of the shaft.

15. In a rotary machine, the combination of a base, a rotary table rotatably supported by the base, the rotary table being provided with spur gear teeth, a spur gear pinion meshing with said spur gear teeth, means to drive said pinion, means forming an enclosed gear chamber between said base and table, lock means mounted within said gear chamber for engaging the spur gear teeth of said table, said lock means being operable from without the chamber.

16. In a rotary machine, the combination of a base, a rotary table rotatably supported by the base, the rotary table being provided with spur gear teeth, a spur gear pinion meshing with said spur gear teeth, means to drive said pinion, means forming an enclosed gear chamber between said base and table, a rotary locking means mounted within said chamber, said locking means being adapted to lock the rotary table from rotation, and means extending through said chamber for actuating the said locking means to and from locking position.

17. In a rotary machine, the combination of a base, a rotary table rotatably supported by the base, the rotary table being provided with spur gear teeth, a spur gear pinion meshing with said spur gear teeth, means to drive said pinion, means forming an enclosed gear chamber between said base and table, a rotary locking means mounted within said chamber, said locking means being adapted to engage said rotary table spur gear to hold the table from rotation, and means extending through said chamber for actuating the said locking means to and from locking position.

18. In a rotary machine, the combination of a base having a vertically extending opening therein, a table mounted in the vertical opening, supporting bearings between the base and the table for rotatably supporting the table, the table having a depending skirt extending downwardly in the opening of the base, an upthrust bearing between the table and the base, a ring adjustably secured to the downwardly depending skirt of the table for supporting the upthrust bearing, and means secured to the ring and adapted to engage the skirt to lock the ring in adjusted position, the latter said means including a locking pawl pivotally mounted on the ring and adapted to engage a notch in the skirt, and means to hold the locking pawl in engagement with the notch.

19. In a rotary machine, the combination of a base having a vertical opening therein, a table mounted in the vertical opening, supporting bearings between the base and the table for rotatably supporting the table on the base, the table having a depending skirt extending downwardly in the opening in the base, an upthrust bearing between the table and the base, a ring adjustably secured to the downwardly depending skirt of the table for supporting the upthrust bearing, and means secured to the ring and adapted to engage the skirt to lock the ring in adjusted position, the latter said means including a locking pawl pivotally mounted on the ring and adapted to engage a notch in the said table, and means to yieldably urge the locking pawl into engagement with the notch.

20. In a rotary machine for drilling wells, the combination of a base having a vertically extending flange, a rotary table rotatably supported within the base and having gear teeth, an annular ring secured to the annular flange with a plurality of bolts, the annular ring projecting radially inward and overlying a portion of the rotary table to define an enclosure for the gear teeth on the table, said annular ring being formed to provide a guard portion around the rotary table and covering the bolts.

ALLEN ERWIN RICE.
JOHN SHELBY MORGAN, Jr.